UNITED STATES PATENT OFFICE 2,468,531

METHOD OF TREATING CASEIN PRODUCTS

Johannes G. Weeldenburg, Velp, Netherlands, assignor to American Enka Corporation, Enka, N. C., a corporation of Delaware No Drawing. Application April 12, 1946, Serial No. 661,517. In the Netherlands September 7, 1945

7 Claims. (Cl. 8—127.6)

The present invention relates to the treatment of protein products and more particularly to a method of improving the properties of threads, fabrics and the like formed from proteins such as casein (milk wool).

In my copending applications Serial Nos. 658,743, filed April 1, 1946 (Patent No. 2,468,530) and 661,516, filed April 12, 1946 (now Patent No. 2,458,886), there is described and claimed the use of certain aromatic alcohols and their salts for improving the properties of viscose rayon and for bonding together cellulose materials and rubber.

It has now been determined that these types of compounds may be used to improve the properties of protein materials and therefore the present invention contemplates the aftertreatment of hardened protein threads and the like with hydroxy aromatic alcohols and their salts.

The invention has, as a further object, to reduce the swelling value and increase the acid resistance of casein threads which have been previously hardened, by subjecting them to the action of dialcohols of mono-substituted phenols, mono-alcohols of double substituted phenols, or their salts.

Other objects and advantages of the present invention will become apparent from the following description which illustrates the types of compounds here involved.

It is well known that the phenol molecule ($C_6H_5OH$) can react with formaldehyde ($H_2CO$) to form a condensation product known as a phenol resin (Bakelite). When this reaction occurs, the three reactive hydrogen atoms of the phenol, i. e., those in positions 2, 4, and 6 react with formaldehyde. The positions 2 and 6 are termed ortho positions and the position 4 is termed para position. Such a condensation product is assumed to form three-dimensional nets.

It is possible in the phenol molecule to substitute for one of the reactive hydrogen atoms, an organic radical such as the methyl group ($CH_3$) which forms a cresol, for example, para-cresol. Of course, it is to be understood that the invention is not to be limited to the methyl group as other substituents acting in the same manner may be substituted for one of the reactive hydrogen atoms. For example, one of the reactive hydrogen atoms may be substituted by an inorganic negative atom such as a chlorine atom which would form a chlorophenol, for example, ortho-chlorophenol.

Para-cresol-dialcohol is formed by the reaction of two molecules of formaldehyde with one molecule of para-cresol. The preparation of these compounds has been described by Ullmann and Brittner (German Chemical Society 1909, page 2540). As described therein, the sodium salt of para-cresol-dialcohol was prepared and separated out as a white substance by mixing one mol. of para-cresol with two mols. of formaldehyde and one mol. of sodium hydroxide leaving the mixture standing at room temperature for a few days. By the addition to a solution of the white substance of an acid such as acetic acid, free para-cresol-dialcohol can be obtained as a white crystallized mass, which, after recrystallization from ethylacetate, had a melting point of 130° C.

The formation of the para-cresol dialcohol in the manner mentioned in the preceding paragraph may be represented as follows:

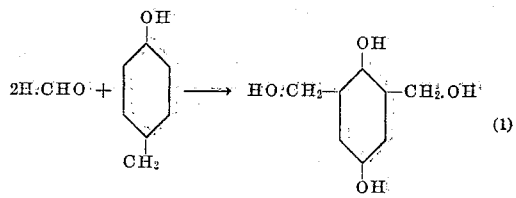

(1)

When two of the reactive hydrogen atoms are substituted in the phenol molecule, the molecule can react with only one molecule of formaldehyde thereby forming a mono-alcohol of double substituted phenol. For example, the synthesis of 2.4-dimethyl-phenol-6-mono-alcohol may be represented by the following equation:

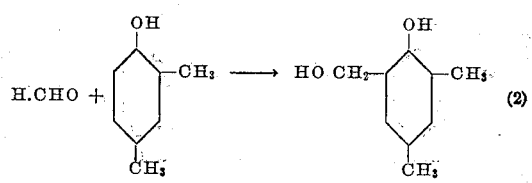

(2)

The dialcohols and monoalcohols referred to in the preceding description may also be designated chemically as dimethylol- and monomethylol-derivatives of a substituted phenol, and from this point on they will be so designated. According to this nomenclature the reaction product shown in Equation 1 is 2.6-dimethylol-4-methyl-phenol and the reaction product shown in Equation 2 is 2.4-dimethyl-6-methyl-phenol.

It will be understood that the preformed monomeric di-methylol- and mono-methylol-derivatives of substituted phenols, and their salts, are employed in the practice of the present invention.

In the above description, the meta or 3 and 5 positions in the phenol or substituted phenol have not been discussed, as these positions are innocuous in the sense of the present invention, but as shown may be satisfied by hydrogen atoms although any neutral group may be substituted just as well.

The above discussed dimethylol derivatives of substituted phenol are capable of reacting with proteins and apparently molecule bridges are formed between the reacting molecules. It has also been determined that the salts of the dimethylol derivatives are useful for treating protein materials. The mono-methylol derivatives or their salts are also effective but to a lesser extent than the dimethylol derivatives.

Upon treatment with these mono- and dimethylol derivatives the protein product does not swell to the same extent, and is not attacked by hot acid solutions as much as the untreated protein.

The present invention is particularly adapted in the manufacture of casein threads and fabrics (so-called milk wool). Casein threads and fabrics have the disadvantage in that even after complete hardening with formaldehyde, they are susceptible of taking up or giving off water, i. e., they swell and "de-swell" to a large extent and are not resistant to hot acid dye baths which are normally employed in the dyeing of wool. For example, when casein threads are boiled in a dilute solution containing only 1 gram of sulphuric acid per liter of water, the threads turn slimy and partially go into solution, and upon drying, form a hard brittle mass.

If the casein threads which have been previously hardened, are immersed for a short time in a heated solution of one of the dimethylol derivatives of mono-substituted phenol or monomethylol derivatives of double substituted phenols or their salts, dried and heated for a few minutes above 100° C., preferably in the neighborhood of 130° C., a final product is obtained which has a low swelling value and has a good resistance to hot acid solutions.

These improved results are not obtained when hardened casein threads are treated with condensation products of unsubstituted phenol and formaldehyde, wherein all three of the reactive hydrogen atoms in the ortho positions and the para position have reacted with molecules of formaldehyde. These substances have such a great tendency to polymerize and do this so rapidly that they have no opportunity to form compounds with the casein molecule. In contradistinction, the treatment with di- and monomethylol derivatives in accordance with the present invention, effects improved results on the casein and it can be explained by assuming that they form molecule bridges with the casein molecule.

*Example 1*

Casein threads which had been hardened with formaldehyde were immersed for 15 minutes in a 2.5% aqueous solution of 2.6-dimethylol-4-methyl-phenol heated to 70° C. After centrifuging and drying, the casein threads were heated to 130° C. for two hours.

Casein threads which had been hardened with formaldehyde were treated according to the method described in U. S. Patent No. Re. 22,262, i. e., with a nitrite.

Casein threads were hardened with formaldehyde, but were not subjected to any subsequent treatment.

Determination of the dry and wet strength and the dry and wet elongation gave the following results:

| | dry strength in grams per 100 denier | wet strength in grams per 100 denier | elongation in percent | |
| --- | --- | --- | --- | --- |
| | | | dry | wet |
| 2.6-dimethylol-4-methyl-phenol | 95 | 47 | 68 | 64 |
| nitrite | 98 | 30 | 77 | 58 |
| untreated (control sample) | 101 | 34 | 69 | 50 |

It will be seen from the above table, that while the physical properties in the dry state were not altered to any material degree, the wet strength was appreciably increased, and the wet elongation was materially increased, these latter two factors being extremely important in the manufacture of commercially satisfactory protein threads.

The three samples were then heated for an hour at 90° C. with a sulphuric acid solution of 0.1% concentration. 29.4% of the untreated control sample was determined to have gone into solution, and that portion which did not dissolve, after drying, had the appearance of a brittle mass. 3% of the sample treated according to the present invention was dissolved under similar treatment with sulphuric acid, and 1.7% of the sample treated with a nitrite was dissolved. These two treated samples, after drying, consisted of soft threads.

*Example 2*

20 grams of para-cresol were dissolved in 45 grams of a 20% sodium hydroxide solution and 36 c. c. of a 35% formaldehyde solution were added. After allowing this mixture to stand at room temperature for three days, the sodium salt of 2.6-dimethylol-4-methyl-phenol had crystallized out. Water was added to make a total volume of 1 liter, whereupon the solution was heated to 70° C. and with the use of litmus was neutralized with acetic acid. In this solution, casein threads which had been previously hardened with formaldehyde were immersed for 15 minutes, whereupon they were dried and heated to 130° C. for about two hours. The swelling value in water of the thus treated casein threads was reduced from 96% to 50%.

A sample of the thread treated in accordance with the above procedure, and a control (untreated) sample were boiled for one-half hour with a sulphuric acid solution of 0.1% concentration. It was determined that 66% of the untreated sample had dissolved, whereas only 9.5% of the sample treated according to the present invention had dissolved.

Normally hardened casein threads which have not been subjected to any special aftertreatment are, in the wet state, still flabby and have a slimy touch. This is appreciably improved with a treatment with a dimethylol derivative of the type described herein. The feel of the wet material is firmer and is more elastic.

It is not necessary to separate the dimethylol derivative by the addition of an acid such as acetic acid mentioned above, as similar results can be obtained by means of the sodium salt of the dimethylol derivative, in which case, it is possible to operate at a lower temperature because the salt is more soluble than the dimethylol derivative. However, when using the salt there is some tendency for the thread to have a yellow coloration.

In conclusion it has been found possible to combine the treatment according to the invention with the finishing process.

What is claimed is:

1. A method of reducing the swelling value and increasing the acid resistance and wet strength of casein threads, fabrics and the like which comprises reacting the casein products with an aqueous solution consisting essentially of a preformed monomeric compound of the class consisting of the di-methylol and the mono-methylol derivatives of mono- and di-substituted phenols, respectively, and their salts, formed from the reaction of formaldehyde and a substituted phenol in which at least one, but not more than two, of the three reactive hydrogen atoms in the para position and ortho positions has been substituted by a substituent selected from the class consisting of —$CH_3$ and —Cl, removing excess solution, and drying and heating to fix said compound upon the treated casein.

2. A method as defined in claim 1 which includes the steps of drying the treated casein products and heating the same for a few hours at a temperature in the neighborhood of 130° C.

3. A method of reducing the swelling value and increasing the acid resistance and wet strength of hardened casein threads, fabrics and the like which comprises reacting the hardened casein products with an aqueous solution consisting essentially of a preformed monomeric mono-substituted dimethylol phenol, where the substituent is selected from the class consisting of —$CH_3$ and —Cl, removing excess solution, and drying and heating to fix said compound upon the treated casein.

4. A method of reducing the swelling value and increasing the acid resistance and wet strength of hardened casein threads, fabrics and the like which comprises reacting the hardened casein products with an aqueous solution consisting essentially of a preformed monomeric mono-substituted dimethylol phenol, where the substituent is selected from the class consisting of —$CH_3$ and —Cl and is in the para position, removing excess solution, and drying and heating to fix said compound upon the treated casein.

5. A method of reducing the swelling value and increasing the acid resistance and wet strength of hardened casein threads, fabrics and the like which comprises reacting the hardened casein products with an aqueous solution consisting essentially of preformed monomeric 2.6-dimethylol-4-methyl-phenol, removing excess solution, and drying and heating to fix said compound upon the treated casein.

6. A method of reducing the swelling value and increasing the acid resistance and wet strength of hardened casein threads, fabrics and the like which comprises reacting the hardened casein products with an aqueous solution consisting essentially of the sodium salt of preformed monomeric 2.6-dimethylol-4-methyl-phenol, removing excess solution, and drying and heating to fix said compound upon the treated casein.

7. A method of reducing the swelling value and increasing the acid resistance and wet strength of hardened casein threads, fabrics and the like which comprises reacting the hardened casein products for about 15 minutes with a 2.5% aqueous solution consisting essentially of preformed monomeric 2.6-dimethylol-4-methyl-phenol heated to 70° C., centrifuging and drying the treated casein products and heating the same for about two hours at a temperature in the neighborhood of 130° C.

JOHANNES G. WEELDENBURG.

REFERENCES CITED

The following references are of record in the file of this patent:

UNITED STATES PATENTS

| Number | Name | Date |
|---|---|---|
| 1,734,516 | Foulds et al. | Nov. 5, 1929 |
| 2,055,322 | Teller | Sept. 22, 1936 |
| 2,190,672 | Meharg | Feb. 20, 1940 |
| 2,211,961 | Meigs | Aug. 20, 1940 |
| 2,312,998 | De Kadt | Mar. 2, 1943 |
| 2,348,602 | Calva | May 9, 1944 |

FOREIGN PATENTS

| Number | Country | Date |
|---|---|---|
| 508,840 | Great Britain | June 26, 1939 |

OTHER REFERENCES

Granger: "Condensation of Phenols with Formaldehyde," I. and E. Chem., vol. 24, No. 4 (April 1932), pages 442–447. Copy in 260-57.

Certificate of Correction

April 26, 1949.

Patent No. 2,468,531.

JOHANNES G. WEELDENBURG

It is hereby certified that error appears in the above numbered patent requiring correction as follows:

In the heading to the printed specification, lines 7 and 8, foreign filing date, strike out "In the Netherlands September 7, 1945" and insert instead *In Germany August 28, 1944;*
and that the said Letters Patent should be read with this correction therein that the same may conform to the record of the case in the Patent Office.

Signed and sealed this 27th day of September, A. D. 1949.

[SEAL]

THOMAS F. MURPHY,
*Assistant Commissioner of Patents.*